United States Patent [19]

Matumura et al.

[11] Patent Number: 4,634,238
[45] Date of Patent: Jan. 6, 1987

[54] PROJECTION LENS

[75] Inventors: Takeshi Matumura; Yoshiaki Himeno, both of Saitama, Japan

[73] Assignee: Fuji Photo Optical Co., Ltd., Saitama, Japan

[21] Appl. No.: 701,737

[22] Filed: Feb. 14, 1985

[30] Foreign Application Priority Data

Apr. 2, 1984 [JP] Japan ............................ 59-66270

[51] Int. Cl.$^4$ .......................... G02B 9/12; G02B 27/18
[52] U.S. Cl. ..................................... 350/432; 350/412; 350/477
[58] Field of Search ................. 350/432, 474, 477, 412

[56] References Cited

U.S. PATENT DOCUMENTS 3,497,577 2/1970 Wichterle ............................ 350/432
4,300,817 11/1981 Betensky ............................ 350/432
4,348,081 9/1982 Betensky ............................ 350/432

OTHER PUBLICATIONS

"A System of Optical Design", The Basics of Image Assessment and of Design Techniques with a Survey of Current Lens Types, by Arthur Cox, 1964, the Focal Press, pp. 470–480.

Primary Examiner—John K. Corbin
Assistant Examiner—Rebecca D. Gass
Attorney, Agent, or Firm—Young & Thompson

[57] ABSTRACT

A projection lens for magnifying and projecting an image appearing on a CRT onto a large screen, comprising, from the screen side, a first lens means including a meniscus lens having both surface convex relative to the screen, a second lens means of positive power and a third lens means group of negative power. The projection lens satisfies the following conditions:

$$0.0 < f/f_1 < 0.1$$

$$1.0 < r_1/f < 9.7$$

f being the focal length of the overall lens, $f_1$ the focal length of the first lens means and $r_1$ the radius of curvature of the screen side surface of the meniscus lens.

13 Claims, 1 Drawing Figure

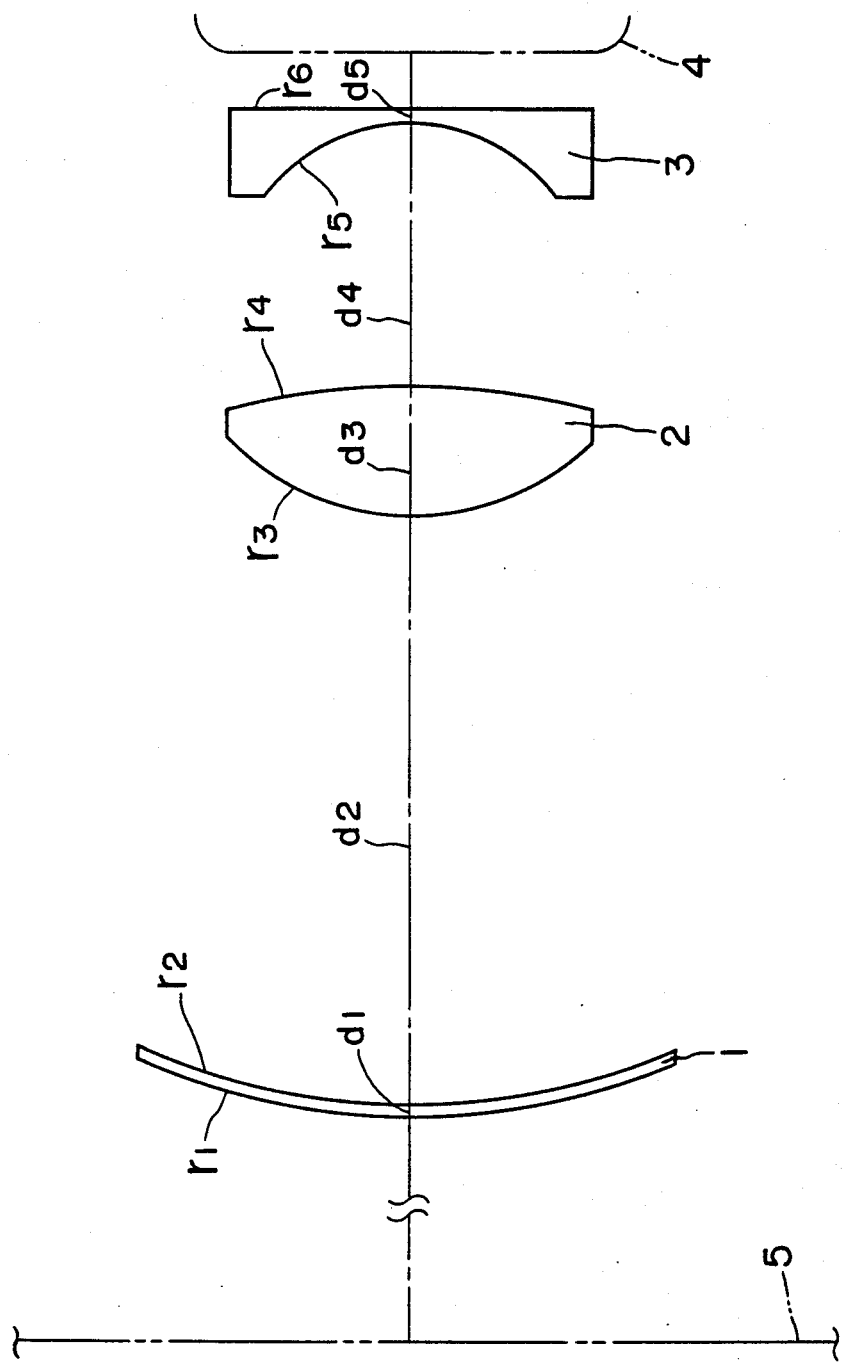

PROJECTION LENS

BACKGROUND OF THE INVENTION

1. Field of the Invention

This invention relates to projection lenses, more particularly to projection lenses suitable for projecting a magnified image appearing on the cathode ray tube (CRT) of a television set on a separate large screen.

2. Description of the Prior Art

Generally, it is very hard to provide CRTs with a screen of a large size from the points of view of manufacturing difficulty and safety. Consequently, a magnified image is never displayed on the screen of a television set. In order to display a magnified image, there are heretofore well known projection television systems, which comprise a projection device and a television set combined. Such projection television systems include three single color CRTs for blue, green and red, a large screen, and three projection lenses each magnifying and projecting a single color image appearing on each CRT on the screen so as to compose the magnified single color image constituting the complex color image thereon.

Since a single color image appears on each CRT described above, it is not necessary to use an achromatic lens as the projection lens. On the other hand, it is preferable to use a lens with an increased aperture, that is a high speed lens, because of the requirement of high magnification power. Nevertheless, heretofore well known projection lenses merely have relative focal-length-to-aperture ratios (F numbers) between 1.2 and 1.0 at best. Moreover, it is a requirement for the economical production of projection lenses that the number of lens elements should be decreased not only for reducing the cost but also for making the projection television system compact. For this reason, it is essential for the projection lenses to have a reduced F number ($F_{No}$), an angle of view as large as possible, and a low cost.

An example of a projection lens satisfying the requirements mentioned above is disclosed in U.S. Pat. No. 4,300,817, in which the projection lens comprises from the screen side a modified Schmidt plate for correcting aberrations mainly due to aperture, a biconvex lens of positive power providing substantially all the positive power of the overall lens, and a negative lens serving as a field flattener for correcting Petzval curvatures of the modified Schmidt plate and the biconvex lens. However, the projection lens of that patent does not correct aberrations sufficiently when the angle of view is larger than 50°. Moreover, there still remain practical problems, namely, the manufacturing cost of the lens, and the difficulty of making a projection television system compact.

SUMMARY OF THE PRESENT INVENTION

An object of the present invention is therefore to provide a projection lens with not only a large angle of view but also a reduced F number in spite of comprising a smaller number of lens components.

Another object of the present invention is to provide a projection lens which is compact and of low manufacturing cost.

A further object of the present invention is to provide a projection lens including as a first group a lens capable of decreasing the manufacturing cost of the projection lens.

Still another object of the present invention is to provide a projection lens which is capable of sufficiently correcting aberrations of the overall lens by using an aspherical lens.

To achieve the above objects, the projection lens of the present invention comprises from the screen side a first lens means comprising a meniscus lens with both surfaces convex relative to the screen, a second lens means including a biconvex lens of positive power and a third lens means including a negative power lens with a concave screen side surface, the projection lens satisfying the following conditions:

$$0.0 < f/f_1 < 0.1 \quad (1)$$

$$1.0 < r_1/f < 9.7 \quad (2)$$

where
- f: the focal length of the overall lens
- $f_1$: the focal length of the first lens means
- $r_1$: the paraxial radius of curvature of screen side surface of the meniscus lens.

In the projection lens according to this invention, an essential spherical aberration, which in heretofore known projection lenses based on the conventional idea has been corrected by using a modified Schmidt plate as a first lens means, is well corrected with the second lens means. The first lens means of this invention comprises a lens element with both surfaces convex relative to the screen so as to inhibit the generation of a sagittal flare as well as to correct the curvature of the sagittal image surface that has been removed insufficiently by the third lens means and that accordingly remains. The provision of such a first lens means enables the projection lens to have a large aperture and a large angle of view. This results in a significant improvement over the state of the art in view of the fact that projection lenses of this kind are compact and of low cost.

If the lower limit of condition (1) is exceeded, the curvature of a sagittal image surface will become more conspicuous and there will be increased astigmatism, resulting in an unbalance between the sagittal and tangential image surfaces. If, on the other hand, the upper limit is exceeded, an increase of sagittal flare results, lowering contrast. Additionally, if the power limit of condition (2) is exceeded, both the sagittal and tangential image surfaces will be undercorrected. If the upper limit is exceeded, an increase of sagittal and tangential flare will result and the curvature of the sagittal image surface will become more conspicuous, resulting in a low contrast.

To use an aspherical lens for each lens means enables the projection lens to have a large aperture (that is, its F number is small), a high resolving power and a large angle of view. Such aspherical lenses can be formed of plastics such as acrylic resin and the like.

BRIEF DESCRIPTION OF THE DRAWING

The exact nature of this invention, as well as other objects and advantages thereof, will be readily apparent from a consideration of the following specification relating to the accompanying drawing wherein:

The single FIGURE illustrates a schematic cross section of a preferred embodiment of the present invention.

DESCRIPTION OF THE PREFERRED EMBODIMENT

As shown in the FIGURE, the projection lens according to the present invention, which comprises three lens means, is arranged in front of a CRT 4 so as to magnify and project an image appearing on the CRT 4 onto a large screen 5. Practically, three arrangements of the lenses and CRT for three single color images, namely blue, green and red, are installed in a projection television system. The three single color images projected are composed on the screen 5 to form a magnified color image.

The first lens means comprises at least a meniscus lens 1 with both surfaces convex relative to the screen 5. The second lens means includes a biconvex lens 2 of positive power and the third lens means includes a negative power lens 3 having a concave screen side surface. If it is desirable to make the projection television system more compact, a reflecting mirror can be provided between the first and second groups to change the optical path.

In each instance described hereafter, reference characters $r_1$, $R_2$, - - -, and $r_6$ represent the paraxial radius (mm) of curvature of the respective lens surface, $d_1$, $d_2$, - - -, and $d_5$ represent the thickness (mm) of the respective lenses or the distances (mm) between opposite surface, and $n_1$, $n_2$ and $n_3$ represent the refractive indices of the respective lenses. Furthermore, $2\omega$ and $F_{No}$ indicate the angle of view and the F-number, respectively. The shape of each aspheric surface is given by $$Z = a_1 y^2 + a_2 y^4 + a_3 y^6 + a_4 u^8 + a_5 y^{10}$$

where
Z: the surface sag at a semi-aperture distance y (mm) from the optical axis (Z axis) of the lens, when the point of intersection of the lens surface with the optical axis is the origin.
$a_1$, $a_2$, - - -, $a_5$: aspherical coefficient.

EXAMPLE 1

| | | | | | |
|---|---|---|---|---|---|
| | \multicolumn{5}{c}{f = 100 mm, $F_{NO}$ = 1.1, $2\omega$ = 54°} |

| | | | | | |
|---|---|---|---|---|---|
| $r_1$ | 155.38 | | | | |
| $r_2$ | 185.45 | $d_1$ | 2.7 | $n_1$ = 1.492 | |
| $r_3$ | 62.41 | $d_2$ | 138.9 | | |
| $r_4$ | −146.18 | $d_3$ | 30.9 | $n_2$ = 1.492 | |
| $r_5$ | −58.83 | $d_4$ | 69.4 | | |
| $r_6$ | ∞ | $d_5$ | 3.0 | $n_3$ = 1.492 | |
| | (mm) | | (mm) | | |

Aspheric Surface

| | $r_1$ | $r_3$ | $r_4$ | $r_5$ |
|---|---|---|---|---|
| $a_1$ | $3.1294 \times 10^{-3}$ | $8.0546 \times 10^{-3}$ | $-3.5391 \times 10^{-3}$ | $-8.4433 \times 10^{-3}$ |
| $a_2$ | $-3.1670 \times 10^{-8}$ | $1.6086 \times 10^{-7}$ | $4.0781 \times 10^{-7}$ | $-4.1541 \times 10^{-6}$ |
| $a_3$ | $-1.8220 \times 10^{-11}$ | $4.2009 \times 10^{-11}$ | $-2.7097 \times 10^{-11}$ | $7.9261 \times 10^{-10}$ |
| $a_4$ | $2.0329 \times 10^{-15}$ | $-2.3208 \times 10^{-14}$ | $-1.3936 \times 10^{-14}$ | $6.9213 \times 10^{-13}$ |
| $a_5$ | $9.9295 \times 10^{-20}$ | $7.2981 \times 10^{-18}$ | $5.9022 \times 10^{-18}$ | $8.1224 \times 10^{-16}$ |

$f/f_1 = 0.05$
$r_1/f = 1.55$

EXAMPLE 2 f = 100 mm, $F_{NO}$ = 1.1, $2\omega$ = 54°

| | | | | |
|---|---|---|---|---|
| $r_1$ | 155.29 | | | |
| $r_2$ | 220.44 | $d_1$ | 4.4 | $n_1$ = 1.492 |
| $r_3$ | 58.55 | $d_2$ | 138.9 | |
| $r_4$ | −154.53 | $d_3$ | 30.9 | $n_2$ = 1.492 |
| $r_5$ | −56.39 | $d_4$ | 62.5 | |
| $r_6$ | ∞ | $d_5$ | 3.0 | $n_3$ = 1.492 |
| | (mm) | | (mm) | |

Aspheric Surface

| | $r_1$ | $r_3$ | $r_4$ | $r_5$ |
|---|---|---|---|---|
| $a_1$ | $3.2197 \times 10^{-3}$ | $8.5400 \times 10^{-3}$ | $-3.2356 \times 10^{-3}$ | $-8.8661 \times 10^{-3}$ |
| $a_2$ | $-1.3608 \times 10^{-8}$ | $2.7053 \times 10^{-7}$ | $4.7409 \times 10^{-7}$ | $-5.9754 \times 10^{-6}$ |
| $a_3$ | $-2.5843 \times 10^{-11}$ | $1.7810 \times 10^{-11}$ | $-1.2740 \times 10^{-11}$ | $2.8544 \times 10^{-9}$ |
| $a_4$ | $4.7488 \times 10^{-15}$ | $3.6654 \times 10^{-14}$ | $-8.3934 \times 10^{-15}$ | $-3.8694 \times 10^{-13}$ |
| $a_5$ | $-4.1794 \times 10^{-19}$ | $-1.1041 \times 10^{-17}$ | $-1.4440 \times 10^{-18}$ | $-8.7292 \times 10^{-16}$ |

$f/f_1 = 0.10$
$r_1/f = 1.55$

EXAMPLE 3 f = 100 mm, $F_{NO}$ = 1.1, $2\omega$ = 54°

| | | | | |
|---|---|---|---|---|
| $r_1$ | 155.41 | | | |
| $r_2$ | 155.41 | $d_1$ | 2.7 | $n_1$ = 1.492 |
| $r_3$ | 66.73 | $d_2$ | 139.0 | |
| $r_4$ | −137.72 | $d_3$ | 30.9 | $n_2$ = 1.492 |
| $r_5$ | −61.58 | $d_4$ | 77.2 | |
| $r_6$ | ∞ | $d_5$ | 3.0 | $n_3$ = 1.492 |
| | (mm) | | (mm) | |

Aspheric Surface

-continued

| f = 100 mm, $F_{NO}$ = 1.1, 2ω = 54° | | | |
|---|---|---|---|
| $r_1$ | $r_3$ | $r_4$ | $r_5$ |
| $a_1$   3.2173 × $10^{-3}$ | 7.4925 × $10^{-3}$ | −3.6305 × $10^{-3}$ | −8.1195 × $10^{-3}$ |
| $a_2$   −6.1752 × $10^{-8}$ | 1.2854 × $10^{-7}$ | 3.5303 × $10^{-7}$ | −2.5810 × $10^{-6}$ |
| $a_3$   −1.4254 × $10^{-11}$ | −1.1170 × $10^{-11}$ | −7.0666 × $10^{-11}$ | −1.2255 × $10^{-9}$ |
| $a_4$   9.1127 × $10^{-16}$ | −1.4590 × $10^{-15}$ | 1.4005 × $10^{-14}$ | 1.5124 × $10^{-12}$ |
| $a_5$   3.8428 × $10^{-20}$ | 1.2194 × $10^{-18}$ | −9.1001 × $10^{-19}$ | −7.2027 × $10^{-16}$ |
| $f/f_1$ = 0.00 | | | |
| $r_1/f$ = 1.55 | | | |

EXAMPLE 4

| f = 100 mm, $F_{NO}$ = 1.1, 2ω = 54° | | | |
|---|---|---|---|
| $r_1$   961.56 | | | |
| $r_2$   ∞ | $d_1$ = 2.7 | | $n_1$ = 1.492 |
| $r_3$   62.18 | $d_2$ = 139.4 | | |
| $r_4$   −148.39 | $d_3$ = 31.0 | | $n_2$ = 1.492 |
| $r_5$   −57.85 | $d_4$ = 69.2 | | |
| $r_6$   ∞ | $d_5$ = 3.0 | | $n_3$ = 1.492 |
| (mm) | (mm) | | |

Aspheric Surface

| | $r_1$ | $r_3$ | $r_4$ | $r_5$ |
|---|---|---|---|---|
| $a_1$ | 5.1999 × $10^{-4}$ | 8.0415 × $10^{-3}$ | −3.3696 × $10^{-3}$ | −8.6434 × $10^{-3}$ |
| $a_2$ | −6.7867 × $10^{-8}$ | 2.0467 × $10^{-7}$ | 4.2749 × $10^{-7}$ | −4.3988 × $10^{-6}$ |
| $a_3$ | −1.5768 × $10^{-11}$ | 3.2218 × $10^{-11}$ | −5.0588 × $10^{-11}$ | 7.6661 × $10^{-10}$ |
| $a_4$ | 2.8799 × $10^{-15}$ | −1.5464 × $10^{-14}$ | 3.0445 × $10^{-16}$ | 7.4497 × $10^{-13}$ |
| $a_5$ | −1.4631 × $10^{-19}$ | 5.8936 × $10^{-18}$ | 3.0026 × $10^{-18}$ | −7.8610 × $10^{-16}$ |
| $f/f_1$ = 0.05 | | | | |
| $r_1/f$ = 9.62 | | | | |

EXAMPLE 5

| f = 100 mm, $F_{NO}$ = 1.1., 2ω = 54° | | | |
|---|---|---|---|
| $r_1$   99.60 | | | |
| $r_2$   111.15 | $d_1$   2.7 | | $n_1$ = 1.492 |
| $r_3$   61.90 | $d_2$   138.9 | | |
| $r_4$   −145.77 | $d_3$   30.9 | | $n_2$ = 1.492 |
| $r_5$   −56.18 | $d_4$   68.6 | | |
| $r_6$   ∞ | $d_5$   3.0 | | $n_3$ = 1.492 |
| (mm) | (mm) | | |

Aspheric Surface

| | $r_1$ | $r_3$ | $r_4$ | $r_5$ |
|---|---|---|---|---|
| $a_1$ | 5.0202 × $10^{-3}$ | 8.0776 × $10^{-3}$ | −3.4301 × $10^{-3}$ | −8.8994 × $10^{-3}$ |
| $a_2$ | 6.0987 × $10^{-8}$ | 2.0912 × $10^{-7}$ | 4.8396 × $10^{-7}$ | −3.9561 × $10^{-6}$ |
| $a_3$ | −2.0408 × $10^{-11}$ | 3.5828 × $10^{-11}$ | −6.3388 × $10^{-11}$ | 4.1021 × $10^{-10}$ |
| $a_4$ | 1.6542 × $10^{-15}$ | −1.0885 × $10^{-14}$ | 8.4568 × $10^{-15}$ | 9.0286 × $10^{-13}$ |
| $a_5$ | −1.2988 × $10^{-19}$ | 6.2769 × $10^{-18}$ | 1.5954 × $10^{-18}$ | −8.7917 × $10^{-16}$ |
| $f/f_1$ = 0.06 | | | | |
| $r_1/f$ = 1.00 | | | | |

What is claimed is:

1. A projection lens for projecting an image on a screen, comprising from the screen side a first lens means comprising a meniscus lens with both surfaces convex relative to the screen, a second lens means of positive power and a third lens means of negative power, wherein said projection lens satisfies the following conditions:

$$0.0 < f/f_1 < 0.1 \quad (1)$$

$$1.0 < r_1/f < 9.7 \quad (2)$$

where
f: the focal length of the overall lens
$f_1$: the focal length of said first lens means
$r_1$: the paraxial radius of curvature of the screen side surface of said meniscus lens.

2. A projection lens as defined in claim 1, wherein each of said lens means comprises one lens.

3. A projection lens as defined in claim 2, wherein said meniscus lens has an aspherical screen side surface.

4. A projection lens as defined in claim 3, wherein said second lens means is a bi-convex lens.

5. A projection lens as defined in claim 4, wherein said third lens means is a plano-concave lens having a concave screen side surface.

6. A projection lens as defined in claim 5, wherein all of said lenses are made of plastics.

7. A projection lens as defined in claim 2, wherein each screen side surface of said three lenses and an image side surface of said second lens are aspherical shapes which are given by the following equation:

$$Z = a_1 y^2 + a_2 y^4 + a_3 y^6 + a_4 y^8 + a_5 y^{10}$$

where
Z: the surface sag at a semi-aperture distance y from the optical axis (Z axis) of the lens, when the point of intersection of the lens surface with the optical axis is the origin, $a_1, a_2, \text{---}, a_5$: aspherical coefficient.

8. A projection lens as defined in claim 7, wherein said projection lens is of focal length $f=100$ mm, F-number 1.1 and angle of view 54°.

9. A projection lens as defined in claim 8, wherein said three lenses have the following value:

| | | | | | |
|---|---|---|---|---|---|
| $r_1$ | 155.38 | | | | |
| $r_2$ | 185.45 | $d_1$ | 2.7 | $n_1 = 1.492$ | |
| $r_3$ | 62.41 | $d_2$ | 138.9 | | |
| $r_4$ | −146.18 | $d_3$ | 30.9 | $n_2 = 1.492$ | |
| $r_5$ | −58.83 | $d_4$ | 69.4 | | |
| $r_6$ | ∞ | $d_5$ | 3.0 | $n_3 = 1.492$ | |

Aspheric Surface

| | $r_1$ | $r_3$ | $r_4$ | $r_5$ |
|---|---|---|---|---|
| $a_1$ | $3.1294 \times 10^{-3}$ | $8.0546 \times 10^{-3}$ | $-3.5391 \times 10^{-3}$ | $-8.4433 \times 10^{-3}$ |
| $a_2$ | $-3.1670 \times 10^{-8}$ | $1.6086 \times 10^{-7}$ | $4.0781 \times 10^{-7}$ | $-4.1541 \times 10^{-6}$ |
| $a_3$ | $-1.8220 \times 10^{-11}$ | $4.2009 \times 10^{-11}$ | $-2.7097 \times 10^{-11}$ | $7.9261 \times 10^{-10}$ |
| $a_4$ | $2.0329 \times 10^{-15}$ | $-2.3208 \times 10^{-14}$ | $-1.3936 \times 10^{-14}$ | $6.9213 \times 10^{-13}$ |
| $a_5$ | $9.9295 \times 10^{-20}$ | $7.2981 \times 10^{-18}$ | $5.9022 \times 10^{-18}$ | $8.1224 \times 10^{-16}$ |

$f/f_1 = 0.05$
$r_1/f = 1.55$ where $r_1$–$r_6$ is the paraxial radius (mm) of curvature of the lens surface of the three lenses from the screen side, $d_1$–$d_5$ is the axial distance (mm) between the lens surfaces from the screen side, $n_1$–$n_3$ is the refractive index of the three lenses from the screen side.

10. A projection lens as defined in claim 8, wherein said three lenses have the following value:

| | | | | | |
|---|---|---|---|---|---|
| $r_1$ | 155.29 | | | | |
| $r_2$ | 220.44 | $d_1$ | 4.4 | $n_1 = 1.492$ | |
| $r_3$ | 58.55 | $d_2$ | 138.9 | | |
| $r_4$ | −154.53 | $d_3$ | 30.9 | $n_2 = 1.492$ | |
| $r_5$ | −56.39 | $d_4$ | 62.5 | | |
| $r_6$ | ∞ | $d_5$ | 3.0 | $n_3 = 1.492$ | |

Aspheric Surface

| | $r_1$ | $r_3$ | $r_4$ | $r_5$ |
|---|---|---|---|---|
| $a_1$ | $3.2197 \times 10^{-3}$ | $8.5400 \times 10^{-3}$ | $-3.2356 \times 10^{-3}$ | $-8.8661 \times 10^{-3}$ |
| $a_2$ | $-1.3608 \times 10^{-8}$ | $2.7053 \times 10^{-7}$ | $4.7409 \times 10^{-7}$ | $-5.9754 \times 10^{-6}$ |
| $a_3$ | $-2.5843 \times 10^{-11}$ | $1.7810 \times 10^{-11}$ | $-1.2740 \times 10^{-11}$ | $2.8544 \times 10^{-9}$ |
| $a_4$ | $4.7488 \times 10^{-15}$ | $3.6654 \times 10^{-14}$ | $-8.3934 \times 10^{-15}$ | $-3.8694 \times 10^{-13}$ |
| $a_5$ | $-4.1794 \times 10^{-19}$ | $-1.1041 \times 10^{-17}$ | $-1.4440 \times 10^{-18}$ | $-8.7292 \times 10^{-16}$ |

$f/f_1 = 0.10$
$r_1/f = 1.55$ where $r_1$–$r_6$ is the paraxial radius (mm) of curvature of the lens surface of the three lenses from the screen side, $d_1$–$d_5$ is the axial distance (mm) between the lens surfaces from the screen side, $n_1$–$n_3$ is the refractive index of the three lenses from the screen side.

11. A projection lens as defined in claim 8, wherein said three lenses have the following value:

| | | | | | |
|---|---|---|---|---|---|
| $r_1$ | 155.41 | | | | |
| $r_2$ | 155.41 | $d_1$ | 2.7 | $n_1 = 1.492$ | |
| $r_3$ | 66.73 | $d_2$ | 139.0 | | |
| $r_4$ | −137.72 | $d_3$ | 30.9 | $n_2 = 1.492$ | |
| $r_5$ | −61.58 | $d_4$ | 77.2 | | |
| $r_6$ | ∞ | $d_5$ | 3.0 | $n_3 = 1.492$ | |

Aspheric Surface

| | $r_1$ | $r_3$ | $r_4$ | $r_5$ |
|---|---|---|---|---|
| $a_1$ | $3.2173 \times 10^{-3}$ | $7.4925 \times 10^{-3}$ | $-3.6305 \times 10^{-3}$ | $-8.1195 \times 10^{-3}$ |
| $a_2$ | $-6.1752 \times 10^{-8}$ | $1.2854 \times 10^{-7}$ | $3.5303 \times 10^{-7}$ | $-2.5810 \times 10^{-6}$ |
| $a_3$ | $-1.4254 \times 10^{-11}$ | $-1.1170 \times 10^{-11}$ | $-7.0666 \times 10^{-11}$ | $-1.2255 \times 10^{-9}$ |
| $a_4$ | $9.1127 \times 10^{-16}$ | $-1.4590 \times 10^{-15}$ | $1.4005 \times 10^{-14}$ | $1.5124 \times 10^{-12}$ |
| $a_5$ | $3.8428 \times 10^{-20}$ | $1.2194 \times 10^{-18}$ | $-9.1001 \times 10^{-19}$ | $-7.2027 \times 10^{-16}$ |

$f/f_1 = 0.00$
$r_1/f = 1.55$ where $r_1$–$r_6$ is the paraxial radius (mm) of curvature of the lens surface of the three lenses from the screen side, $d_1$–$d_5$ is the axial distance (mm) between the lens surfaces from the screen side, $n_1$–$n_3$ is the refractive index of the three lenses from the screen side.

12. A projection lens as defined in claim 8, wherein said three lenses have the following value:

| | |
|---|---|
| $r_1$ | 961.56 |

-continued

| | | | | | |
|---|---|---|---|---|---|
| $r_2$ | $\infty$ | $d_1 =$ | 2.7 | $n_1 = 1.492$ | |
| $r_3$ | 62.18 | $d_2 =$ | 139.4 | | |
| $r_4$ | −148.39 | $d_3 =$ | 31.0 | $n_2 = 1.492$ | |
| $r_5$ | −57.85 | $d_4 =$ | 69.2 | | |
| $r_6$ | $\infty$ | $d_5 =$ | 3.0 | $n_3 = 1.492$ | |

Aspheric Surface

| | $r_1$ | $r_3$ | $r_4$ | $r_5$ |
|---|---|---|---|---|
| $a_1$ | $5.1999 \times 10^{-4}$ | $8.0415 \times 10^{-3}$ | $-3.3696 \times 10^{-3}$ | $-8.6434 \times 10^{-3}$ |
| $a_2$ | $-6.7867 \times 10^{-8}$ | $2.0467 \times 10^{-7}$ | $4.2749 \times 10^{-7}$ | $-5.3988 \times 10^{-6}$ |
| $a_3$ | $-1.5768 \times 10^{-11}$ | $3.2218 \times 10^{-11}$ | $-5.0588 \times 10^{-11}$ | $7.6661 \times 10^{-10}$ |
| $a_4$ | $2.8799 \times 10^{-15}$ | $-1.5464 \times 10^{-14}$ | $3.0445 \times 10^{-16}$ | $7.4497 \times 10^{-13}$ |
| $a_5$ | $-1.4631 \times 10^{-19}$ | $5.8936 \times 10^{-18}$ | $3.0026 \times 10^{-18}$ | $-7.8610 \times 10^{-16}$ |

$f/f_1 = 0.05$
$r_1/f = 9.62$ where
$r_1$–$r_6$ is the paraxial radius (mm) of curvature of the lens surface of the three lenses from the screen side,
$d_1$–$d_5$ is the axial distance (mm) between the lens surfaces from the screen side,
$n_1$–$n_3$ is the refractive index of the three lenses from the screen side.

13. A projection lens as defined in claim 8, wherein said three lenses have the following value:

| | | | | | |
|---|---|---|---|---|---|
| $r_1$ | 99.60 | | | | |
| $r_2$ | 111.15 | $d_1$ | 2.7 | $n_1 = 1.492$ | |
| $r_3$ | 61.90 | $d_2$ | 138.9 | | |
| $r_4$ | −145.77 | $d_3$ | 30.9 | $n_2 = 1.492$ | |
| $r_5$ | −56.18 | $d_4$ | 68.6 | | |
| $r_6$ | $\infty$ | $d_5$ | 3.0 | $n_3 = 1.492$ |

Aspheric Surface

| | $r_1$ | $r_3$ | $r_4$ | $r_5$ |
|---|---|---|---|---|
| $a_1$ | $5.0202 \times 10^{-3}$ | $8.0776 \times 10^{-3}$ | $-3.4301 \times 10^{-3}$ | $-8.8994 \times 10^{-3}$ |
| $a_2$ | $6.0987 \times 10^{-8}$ | $2.0912 \times 10^{-7}$ | $4.8396 \times 10^{-7}$ | $-3.9561 \times 10^{-6}$ |
| $a_3$ | $-2.0408 \times 10^{-11}$ | $3.5828 \times 10^{-11}$ | $-6.3388 \times 10^{-11}$ | $4.1021 \times 10^{-10}$ |
| $a_4$ | $1.6542 \times 10^{31\ 15}$ | $-1.0885 \times 10^{-14}$ | $8.4568 \times 10^{-15}$ | $9.0286 \times 10^{-13}$ |
| $a_5$ | $-1.2988 \times 10^{-19}$ | $6.2769 \times 10^{-18}$ | $1.5954 \times 10^{-18}$ | $-8.7917 \times 10^{-16}$ |

$f/f_1 = 0.06$
$r_1/f = 1.00$ where
$r_1$–$r_6$ is the paraxial radius (mm) of curvature of the lens surface of the three lenses from the screen side,
$d_1$–$d_5$ is the axial distance (mm) between the lens surfaces from the screen side,
$n_1$–$n_3$ is the refractive index of the three lenses from the screen side.

* * * * *